(12) United States Patent
Nolan et al.

(10) Patent No.: US 10,502,399 B2
(45) Date of Patent: Dec. 10, 2019

(54) METHOD AND SYSTEM FOR ALIGNMENT OF ILLUMINATION DEVICE

(71) Applicant: EATON INTELLIGENT POWER LIMITED, Dublin (IE)

(72) Inventors: Christopher D. Nolan, Syracuse, NY (US); Joseph J. Witkowski, Syracuse, NY (US); Joseph R. Casper, Syracuse, NY (US); Benjamin David Vollmer, Syracuse, NY (US)

(73) Assignee: Eaton Intelligent Power Limited, Dublin (IE)

( * ) Notice: Subject to any disclaimer, the term of this patent is extended or adjusted under 35 U.S.C. 154(b) by 316 days.

(21) Appl. No.: 15/392,178

(22) Filed: Dec. 28, 2016

(65) Prior Publication Data
US 2017/0184289 A1   Jun. 29, 2017

Related U.S. Application Data

(60) Provisional application No. 62/271,588, filed on Dec. 28, 2015.

(51) Int. Cl.
| | |
|---|---|
| *F21V 21/15* | (2006.01) |
| *G01C 5/00* | (2006.01) |
| *G01C 19/02* | (2006.01) |
| *G01P 15/18* | (2013.01) |
| *F21V 21/14* | (2006.01) |
| *F21V 29/75* | (2015.01) |

(Continued)

(52) U.S. Cl.
CPC .............. *F21V 21/15* (2013.01); *F21V 21/14* (2013.01); *G01C 5/00* (2013.01); *G01C 19/02* (2013.01); *G01P 15/18* (2013.01); *F21S 8/08* (2013.01); *F21V 21/30* (2013.01); *F21V 23/0442* (2013.01); *F21V 23/0492* (2013.01); *F21V 29/507* (2015.01); *F21V 29/75* (2015.01); *F21W 2131/105* (2013.01); *F21Y 2115/10* (2016.08)

(58) Field of Classification Search
CPC .............. H05B 37/029; H05B 33/0863; H05B 37/0245; H05B 37/02; H05B 37/0227; F21Y 2115/10; F21Y 2107/50; F21Y 2113/17
USPC ................................ 315/292, 131, 291, 297
See application file for complete search history.

(56) References Cited

U.S. PATENT DOCUMENTS

| | | |
|---|---|---|
| 9,198,262 B1 | 11/2015 | Bosua et al. |
| 2002/0075691 A1 | 6/2002 | Couillaud et al. |

(Continued)

FOREIGN PATENT DOCUMENTS

| | | |
|---|---|---|
| CN | 102749072 A | 10/2012 |
| EP | 2760257 A1 | 7/2014 |

(Continued)

*Primary Examiner* — Wei (Victor) Y Chan
(74) *Attorney, Agent, or Firm* — Fox Rothschild LLP

(57) ABSTRACT

A method for providing assistance in aiming of one or more illumination devices in an area may include, by a processor, receiving photometric data for an area, and using the photometric data to determine an aiming vector for the illumination device. the area may include the illumination device. the method may further include receiving, from an orientation sensor module of the illumination device, orientation data for the illumination device, and using the orientation data and the aiming vector to determine if there is an error in the aiming of the illumination device.

15 Claims, 9 Drawing Sheets

(51) Int. Cl.
*F21Y 115/10* (2016.01)
*F21S 8/08* (2006.01)
*F21V 21/30* (2006.01)
*F21V 23/04* (2006.01)
*F21W 131/105* (2006.01)
*F21V 29/507* (2015.01)

(56) References Cited

U.S. PATENT DOCUMENTS

| | | | |
|---|---|---|---|
| 2006/0245189 A1 | 11/2006 | Gordin | |
| 2011/0285515 A1 | 11/2011 | Fushimi et al. | |
| 2012/0235580 A1 | 9/2012 | Lee | |
| 2013/0101163 A1* | 4/2013 | Gupta | G06K 9/00671 382/103 |
| 2013/0268246 A1* | 10/2013 | Gordin | G06F 17/50 703/1 |
| 2015/0003084 A1* | 1/2015 | Eichel | F21V 21/14 362/419 |
| 2015/0098709 A1 | 4/2015 | Breuer et al. | |
| 2017/0009969 A1* | 1/2017 | Conti | F21V 9/40 |

FOREIGN PATENT DOCUMENTS

| | | |
|---|---|---|
| JP | 2010257742 A | 11/2010 |
| JP | 2015082470 A | 4/2015 |
| WO | 2015101647 A1 | 7/2015 |
| WO | 2015128143 A1 | 9/2015 |
| WO | 2016008746 A1 | 1/2016 |

\* cited by examiner

METHOD AND SYSTEM FOR ALIGNMENT OF ILLUMINATION DEVICE

RELATED APPLICATIONS AND CLAIM OF PRIORITY

This patent document claims priority to U.S. provisional patent application No. 62/271,588, filed Dec. 28, 2015, the disclosure of which is hereby incorporated by reference in full.

BACKGROUND

The advent of light emitting diode (LED) based luminaires has provided sports arenas, stadiums, other entertainment facilities, and other commercial and industrial facilities the ability to achieve instant on-off capabilities, intelligent controls and adjustability while delivering excellent light quality, consistent light output, and improved energy efficiency. Because of this, users continue to seek improvements in LED lighting devices. For example, new and improved ways to direct light in multiple directions, and to provide luminaires with high light output in a compact package, are desired.

Light output is defined by how the luminaire is mounted and oriented relative to the ceiling or other structures. LED Lighting fixtures often have a projected beam which may vary in intensity from the highest intensity (100%) at a central point along the central axis to a point at some angle where the light is diminished. At some angle in-between the central point and the diminished extent, the beam will have an intensity of 50% of the central value. When this beam is projected normal to a surface, the points on the surface having that 50% intensity may be described as the "50% isocandela curve" (or "50% curve"). When two lights are aimed such the 50% curve from each light source are partially intersecting, the effect will be illumination that is close to 100% of the value of one fixture across most of the area which is illuminated simultaneously by both lights. This becomes a principle for aiming one or more light fixtures to achieve the desired lighting results. These points are determined using a light meter, and are not obvious to the casual observer such as a person installing the lights. This contributes to the impression of even lighting in a given area, but can make precise aiming of light fixtures difficult.

In addition, once a luminaire is aimed in a desired direction, wind, ground tremors, collisions with physical objects, and other actions can cause the luminaire to become misaligned.

This document describes new methods for assisted aiming of light fixtures directed to solving the issues described above, and/or other problems.

SUMMARY

In an embodiment, a method for providing assistance in aiming of one or more illumination devices in an area may include, receiving by a processor, photometric data for an. The area may include one or more illumination devices. The method may further include using the photometric data to determine an aiming vector for the illumination device, and receiving, from an orientation sensor module of the illumination device, orientation data for the illumination device. The method may further include using the orientation data and the aiming vector to determine if there is an error in the aiming of the illumination device.

The method may also include generating an error message at a user interface of an electronic device in response to the determination that there is an error in the aiming of the illumination device. In an embodiment, the error message may include a set of instructions to the user to assist the user in accurate aiming of the illumination device.

In certain embodiments, the orientation data may include orientation vectors, a linear acceleration, a yaw, a pitch, a roll of the illumination device, or a combination thereof. In some embodiments, the orientation sensor module may include an accelerometer, a gyroscope, an altimeter, a magnetometer, or a combination thereof.

In an embodiment, the method may also include providing control signals to a controller associated with a driving means of the illumination device for correcting the error in the aiming of the illumination device. The driving means control one or more connectors configured to attach the illumination device to a support structure.

In at least one embodiment, using the current orientation data and the aiming vector to determine if there is an error in the aiming of the illumination device may include determining whether there is a threshold difference between a current orientation of the illumination device and a desired orientation of the illumination device. The desired orientation may correspond to the aiming vector.

In an embodiment, the method may also include determining a rate of change of orientation of the illumination device. The rate of change of orientation may be indicative of an event that resulted in the error in the aiming of the illumination device.

In another embodiment, the method may include providing a control signal to a controller associated with motor for correcting the error in the aiming of the illumination device. The motor may be configured to control orientation of the illumination device or a light emitting diode (LED) module included in the illumination device.

In another aspect of this disclosure, a lighting control system may include an illumination device that provides illumination to an area. The illumination device may include one or more orientation sensors, a processor, and a computer-readable medium containing programming instructions that. In an embodiment the programming instructions, when instructed may cause the processor to: receive photometric data for the area, use the photometric data to determine an aiming vector for the illumination device, receive current orientation data for the illumination device from the one or more orientation sensors of the illumination device, and use the current orientation data and the aiming vector to determine if there is an error in the aiming of the illumination device.

DETAILED DESCRIPTION

Figure 1:
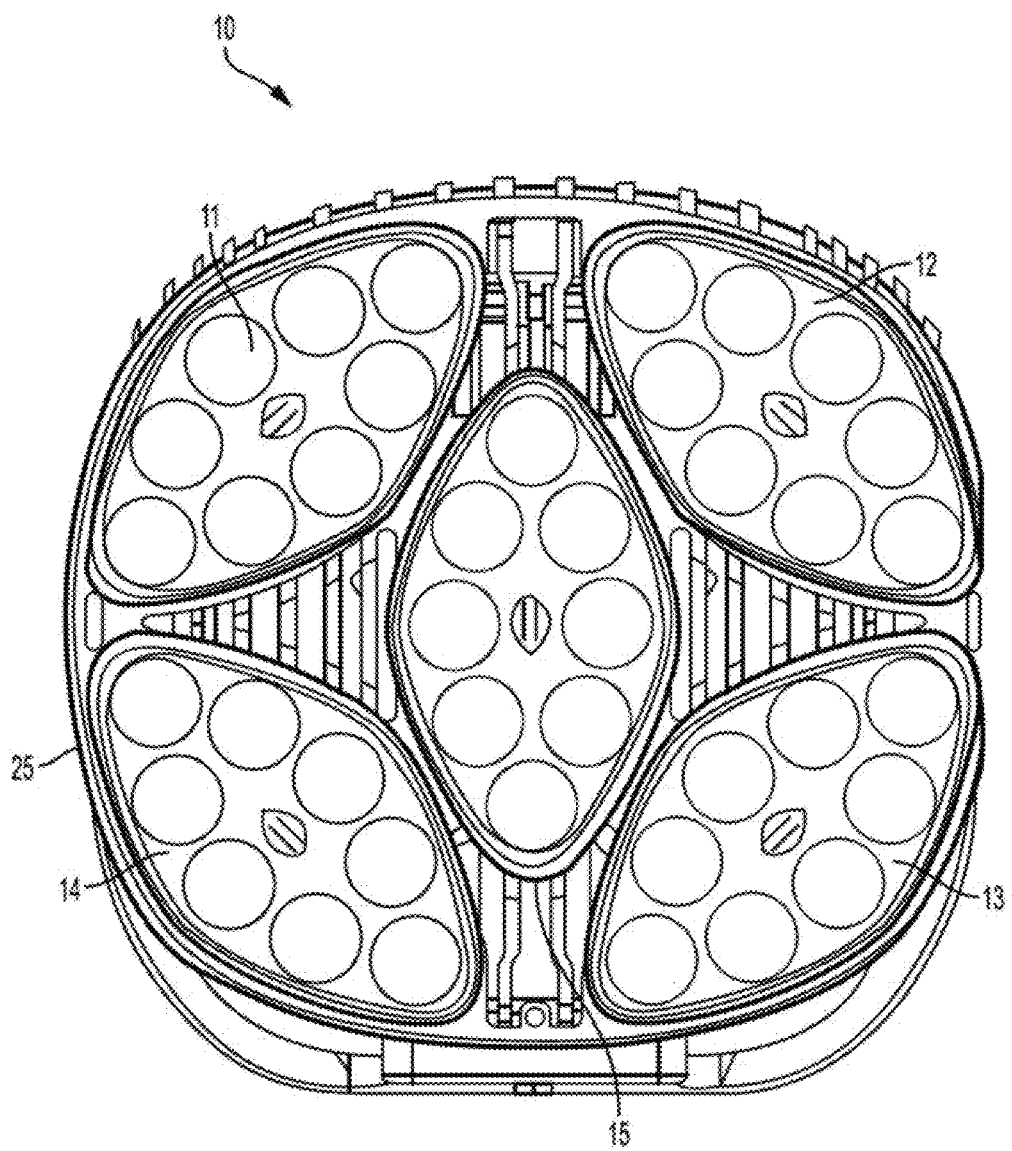
FIG. 1 illustrates a front view of an example of one embodiment of the illumination devices disclosed in this document.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

When used in this document, terms such as "top" and "bottom," "upper" and "lower", or "front" and "rear," are not intended to have absolute orientations but are instead intended to describe relative positions of various components with respect to each other. For example, a first component may be an "upper" component and a second component may be a "lower" component when a light fixture is oriented in a first direction. The relative orientations of the components may be reversed, or the components may be on the same plane, if the orientation of a light fixture that contains the components is changed. The claims are intended to include all orientations of a device containing such components.

A "computing device" or "electronic device" refers to an electronic device having a processor and memory an d/or a communication device that can access a memory device. A communication device of an electronic device may include, for example, a short range wireless communication interface such as a transmitter, a near field communication (NFC) or radio frequency identifier (RFID) tag or Bluetooth Low Energy (BLE) receiver (with reduced transmit power), a processor and non-transitory, computer-readable memory. The memory will contain or receive programming instructions that, when executed by the processor, will cause the electronic device to perform one or more operations according to the programming instructions. Examples of electronic devices include personal computers, servers, mainframes, virtual machines, containers, gaming systems, televisions, and mobile electronic devices such as smartphones, wearable virtual reality devices, Internet-connected wearables such as smart watches and smart eyewear, personal digital assistants, tablet computers, laptop computers, media players and the like. Electronic devices also may include appliances and other devices that can communicate in an Internet-of-things arrangement, such as smart thermostats, home controller devices, voice-activated digital home assistants, connected light bulbs and other devices. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container may also be considered to be an electronic device. In the discussion below, a client device, server device, virtual machine or container may be referred to simply as a "device" for brevity. Additional elements that may be included in electronic devices will be discussed below in the context of FIG. 9.

In this document, the terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, the terms "memory," "memory device," "computer-readable memory," "computer-readable medium," or "data store," "data storage facility" and the like each refer to a non-transitory device on which computer-readable data, programming instructions or both are stored. Except where specifically stated otherwise, these terms are intended to include single device embodiments, embodiments in which multiple memory devices together or collectively store a set of data or instructions, as well as individual sectors within such devices.

A "controller device" is an electronic device that is configured to execute commands to control one or more other devices or device components, such as driving means of one or more illumination device. A "controller card" or "control card" or "control module" refers to a circuit component that acts as the interface between an input interface (such as an input interface of a controller device) and a lighting device.

"Electronic communication" refers to the ability to transmit data via one or more signals between two or more electronic devices, whether through a wired or wireless network, and whether directly or indirectly via one or more intermediary devices.

Figure 2:
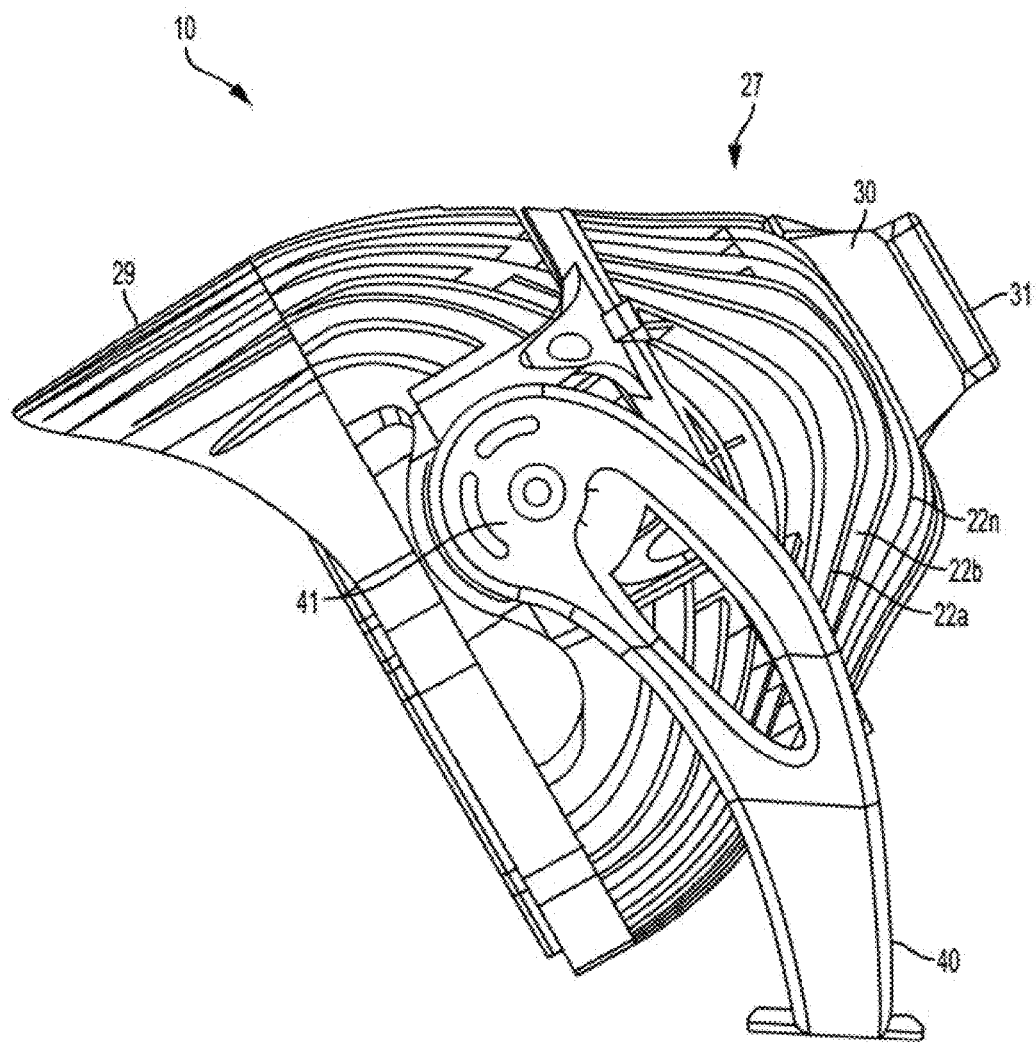
FIG. 2 illustrates a view from one side of the device of FIG. 1.

FIG. 1 illustrates a front view of an example of an example of an illumination device that may be used in the embodiments described below. FIG. 2 illustrates a view from one side of the device of FIG. 1, while FIG. 2 provides a perspective view. The illumination device 10 includes a housing 25 that encases various components of a light fixture. As shown in FIG. 1, the housing 25 includes an opening in which a set of light emitting diode (LED) modules 11-15 are secured to form a multi-module LED structure. The LED modules 11-15 are positioned to emit light away from the fixture. Each LED module includes a frame that holds a set of LEDs arranged in an array or other configuration. In various embodiments the number of LEDs in each module may be any number that is sufficient to provide a high intensity LED device. Each LED module will also include a substrate on which the LEDs, various conductors and/or electronic devices, and lenses for the LEDs are mounted.

The opening of the housing 25 may be circular, square, or a square with round corners as shown in FIG. 1, although other shapes are possible. The LED modules 11-15 may include five modules as shown, with four of the modules 11-14 positioned in a quadrant of the opening and the fifth module 15 positioned in the center as shown. Alternatively, any other number of LED modules, such as one, two, three, four or more LED modules, may be positioned within the opening in any configuration.

The device's housing 25 includes a body portion 27 and an optional shroud portion 29. The body portion 27 serves as a heat sink that dissipates heat that is generated by the LED modules. The body/heat sink 27 may be formed of aluminum and/or other metal, plastic or other material, and it may include any number of fins $22a \ldots 22n$ on the exterior to increase its surface area that will contact a surrounding cooling medium (typically, air). Thus, the body portion 27 or the entire housing 25 may have a bowl shape as shown, the LED modules 11-15 may fit within the opening of the bowl, and heat from the LED modules 11-15 may be drawn away from the LED modules and dissipated via the fins 22a . . . 22n on the exterior of the bowl.

While the LED modules are positioned at the front of body portion 27, the opposing side of the body portion may be attached to a power supply unit 31, optionally via a thermal interface plate. The power supply unit 31 may include a battery, solar panel, or circuitry to receive power from an external and/or other internal source. A power supply unit 31 may be positioned at the rear of the body (i.e., at the bottom of the bowl), and the interior of the unit may include wiring or other conductive elements to transfer power and/or control signals from the power supply unit 30 to the LED modules 11-15. The power supply 31 may be positioned at or near the rear of the body as shown, or it may be placed into the housing so that it is flush or substantially flush with the rear of the body 27, or it may be configured to extend to some point between being flush with the body portion 27 and an extended position. A sensor cavity 32 may be attached to the power supply and/or other part of the device as shown, and it may contain sensors and/or control and communications hardware for sensing parameters of and controlling the device, receiving commands, and transmitting data to remote control devices.

The housing 25 may be formed as a single piece, or it may be formed of two pieces that fit together as in a clamshell-type structure. In a clamshell design, a portion of the interior wall of the clamshell near its opening may include a groove, ridge, or other supporting structure that is configured to receive and secure the LED structure in the opening when the clamshell is closed. In addition, the fins 22a . . . 22n may be curved or arced as shown, with the base of each fin's curve/arc positioned proximate the opening/LED modules, and the apex of each fin's curve/arc positioned distal from the opening/LED modules to further help draw heat away from the LED modules. The housing may be attached to a support structure 40, such as a base or mounting yoke, optionally by one or more connectors 41. As shown, the connectors 41 may include axles about which the housing and/or support structure may be rotated to enable the light assembly to be positioned to direct light at a desired angle. In an embodiment, the connectors 41 may be controlled by a driving means such as an electric motor in communication with a controller. The controller may provide appropriate aiming commands to the driving means for accurate positioning of the illumination device. While FIG. 2 illustrates freedom of movement of the illumination device in an y-z plane (pan and tilt relative to the support structure), it will be understood to those skilled in the art that similar principles can be applied to allow for movement of the illumination device in other planes as well, for aiming of the lighting device. Furthermore, one or more of the LED modules 11-15 may be coupled to the electronic motors may be separately coupled to the housing 25 via driving means for separately controlling the aiming of the LED modules 11-15.

The power supply unit 31 may be detachable from remainder of the lighting device's housing 25 so that it can be replaced and/or removed for maintenance without the need to remove the entire device from an installed location, or so that it can be remotely mounted to reduce weight. The power supply unit 31 and/or a portion of the lighting unit housing 25 may include one or more antennae, transceivers or other communication devices that can receive control signals from an external source such as control signals for controlling the driving means. For example, the illumination device may include a wireless receiver and an antenna that is configured to receive control signals via a wireless communication protocol. Optionally, a portion of the lighting unit housing 25 or shroud 29 (described below) may be equipped with an attached laser pointer that can be used to identify a distal point in an environment to which the lighting device directs its light. The laser pointer can thus help with installation and alignment of the device to a desired focal point.

FIGS. 1 and 2 show that the device may include a shroud 29 that protects and shields the LED modules 11-15 from falling rain and debris, and that may help direct light toward an intended illumination surface. The shroud 29 may have any suitable width so that an upper portion positioned at the top of the housing is wider than a lower portion positioned at the bottom and/or along the sides of the opening of the housing. This may help to reduce the amount of light wasted to the atmosphere by reflecting and redirecting stray light downward to the intended illumination surface. FIG. 2 illustrates that in an embodiment, some or all of the fins of the housing 22a-22n may be contiguous with fin portions 23a-23n that extend across the shroud 29. With this option, the shroud 29 can also serve as part of the heat sink.

The fins 22a . . . 22n may be positioned substantially vertically (i.e., lengthwise from a top portion of the LED array structure and shroud 29 to a bottom portion of the same). Optionally, one or more lateral supports may be interconnected with the fins to provide support to the housing. The lateral supports may be positioned substantially parallel to the axis of the fins, or they may be curved to extend away from the LED structure, or they may be formed of any suitable shape and placed in any position. Each support may connect two or more of the fins. The fins and optional supports form the body portion 27 as a grate, and hot air may rise through the spaces that exist between the fins and supports of the grate. In addition, precipitation may freely fall through the openings of the grate. In addition, any small debris (such dust or bird droppings) that is caught in the grate may be washed away when precipitation next occurs.

Figure 6B:
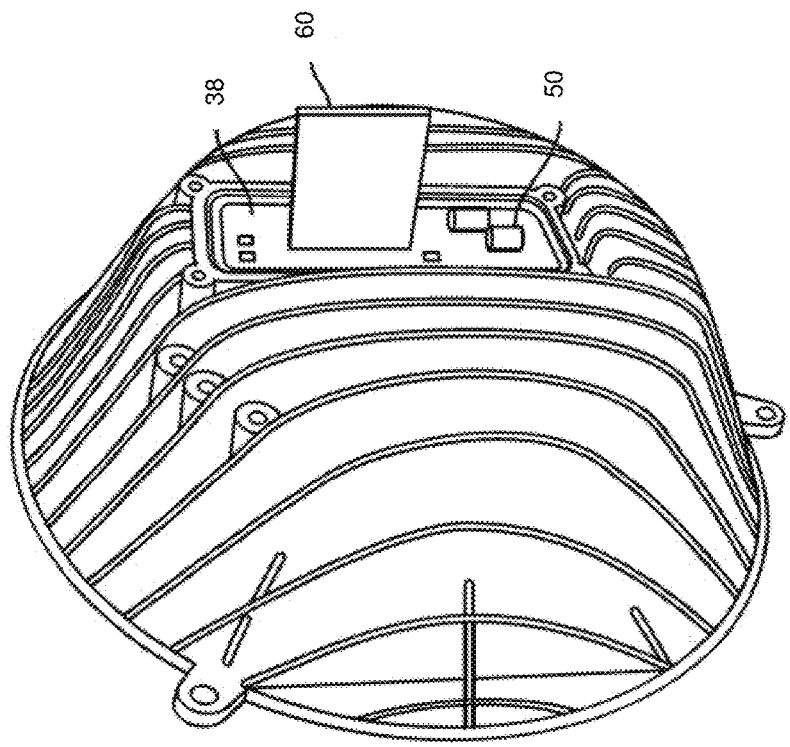
FIG. 6A and FIG. 6B illustrate an example substrate of an illumination device including an orientation sensor module, according to an embodiment.
Figure 6A:
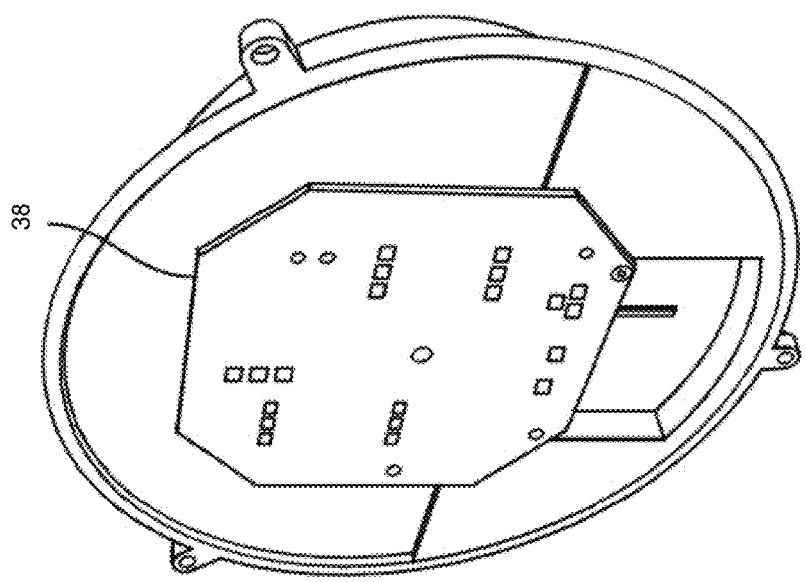
Figure 7:
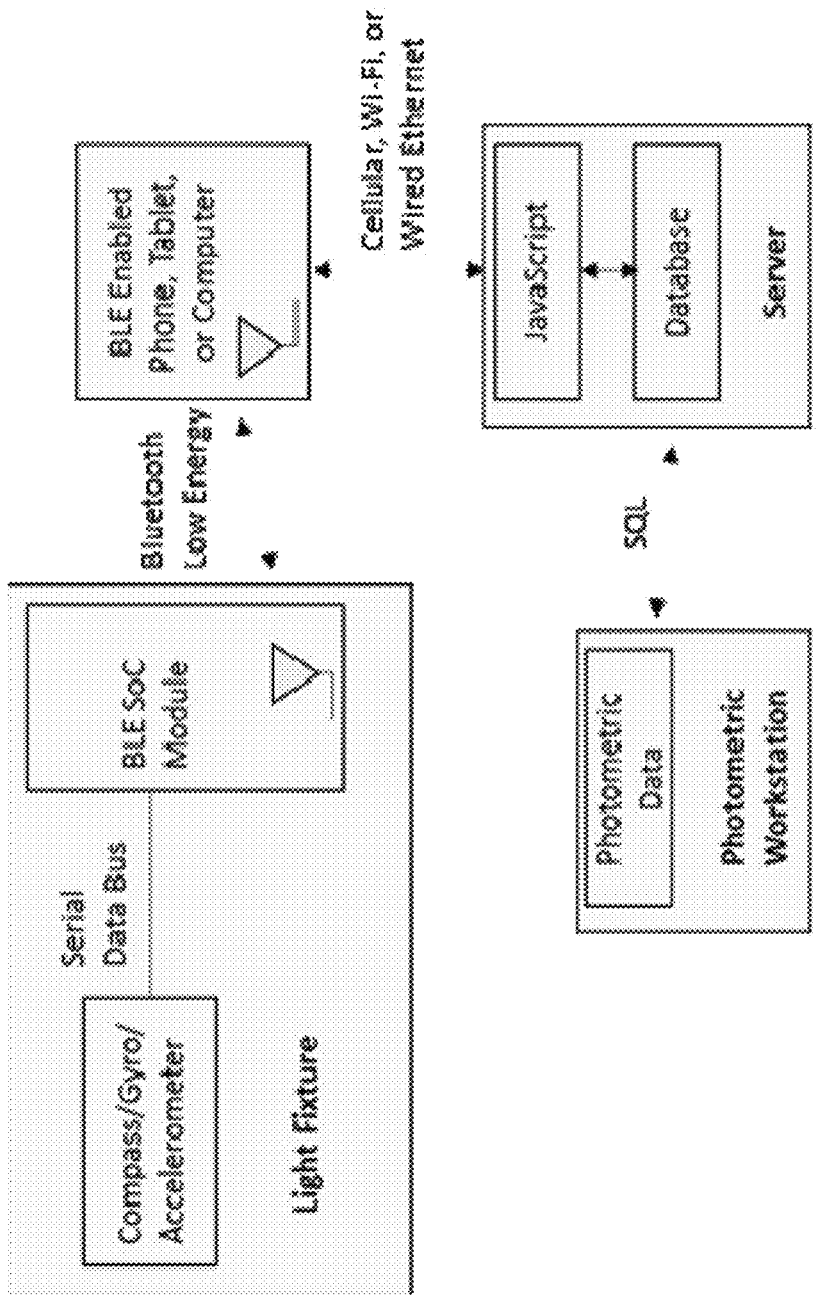
FIG. 7 illustrates a block diagrams of various devices of the system in communication with each other, according to an alternate embodiment.

The illumination device may also include a multi-axis orientation sensor module (not shown here) for providing the motion and orientation data of the illumination device. The multi-axis orientation sensor module may include sensors such as a three-axis accelerometer, a three-axis gyroscope, a three-axis magnetometer (digital compass), a global positioning system (GPS) sensor device that receives positional data from an external GPS network, an altimeter, and the like. The gyroscope and accelerometer may provide information about accelerations of the illumination device in all three directions, and rotations around each axis. The magnetometer readings may be used to compensate for small drifts in order to provide for absolute change in position and orientation much more accurately even for during very complex movements of the lighting device. In an example embodiment, the multi-axis motion sensor module may be a 9-axis motion sensor module. As shown in FIG. 6A, and FIG. 6B, in an embodiment, an orientation sensor module 50 may be located on or near a substrate 38 of an illumination device. As shown, in illumination device LED module includes a substrate 38 on which a number of LEDs 39 are positioned. The substrate 38 may hold circuitry that provides electrical communication paths between the LEDs and a control card or a controller 60 and other components such as an orientation sensor module. In an example embodiment, the electrical communication may be an I²C communication protocol.

While the embodiments of FIGS. 1 and 2 illustrate an LED illumination device, the invention is not limited to the type of lighting device shown in FIGS. 1 and 2. Other types of lighting devices may incorporate the features that will now be described.

In an embodiment, the illumination device may also include a wireless communication module configured to send and/or receive information to and/or from another device. For example, in an embodiment, the communication module may be electrically connected to the orientation sensor module and may transmit orientation data to an electronic device. In an embodiment, the communication module may be a short-range communications module such as near field communication (NFC), Bluetooth low energy (BLE), radio frequency identification (RFID), and the like.

Figure 3:
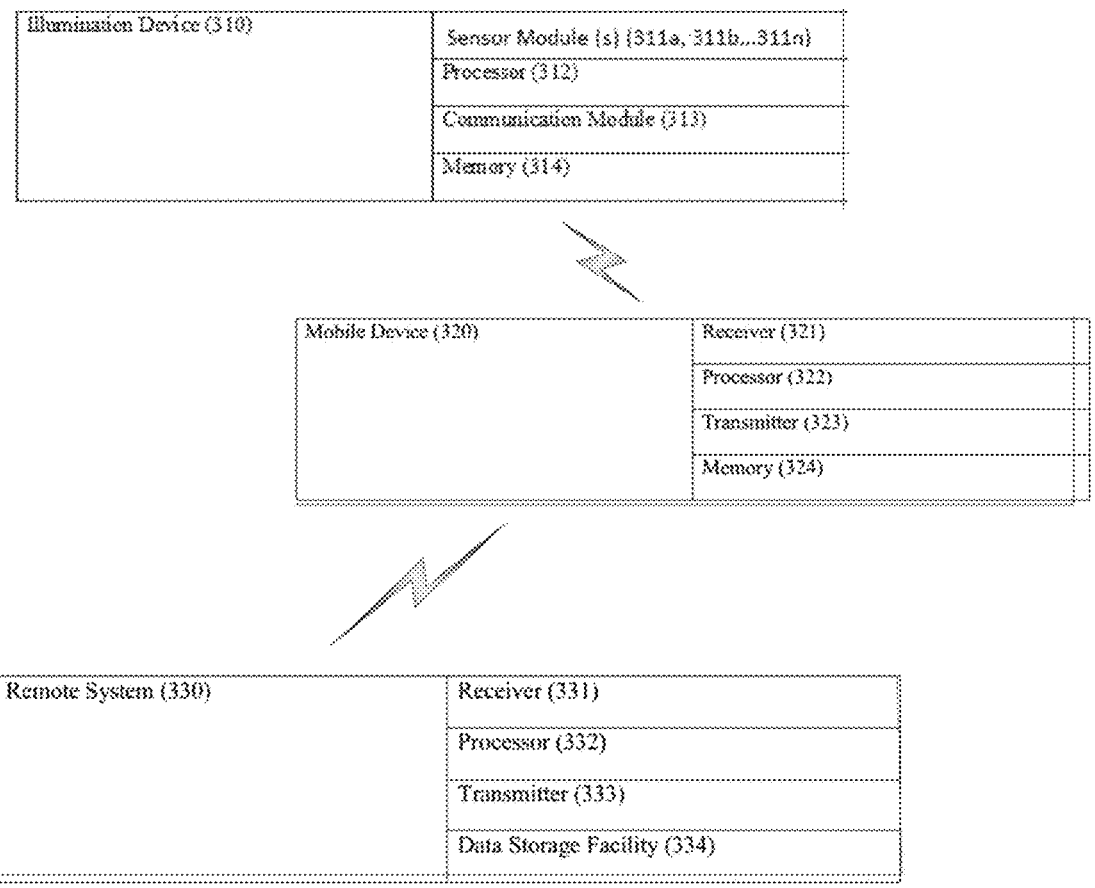
FIG. 3 provides an example system for assisted aiming of light fixtures, according to an embodiment.

FIG. 3 is a block diagram that illustrates various elements of a system for assisting in the aiming or alignment of an illumination device, according to an embodiment. Various devices in the system may communicate with each other via one or more communication protocols and/or networks. Examples may include, without limitation, WiFi, short-range communications such as Bluetooth™ or Bluetooth™ low energy (BLE), cellular networks, Zigbee™, and other similar networks and/or protocols.

As discussed above, the illumination device 310 may include an orientation sensor module 311 such as an accelerometer and/or gyroscope that generates an electronic signal that is indicative of one or more directions of movement, speeds of movement, and/or orientation of the device.

The illumination device 310 may also include a processor 312 that is in electronic communication with the orientation sensor module so that it can receive data generated from the orientation sensor module and generate data for delivery to another device. The generated data may be the received data, or it may be processed data that results from the processor performing one or more operations on the received data as described below. The illumination device 310 may include a communication module 313 that is capable of transmitting data that the sensor generates and/or the processor outputs via a wireless short communication, via a wireless transmitter. When transmitting such data, the communication module may append or include a device identifier (such as an identification code) with each data packet or other data structure transmitted so that the receiver of the data can use the device identifier to determine which lighting device transmitted the data.

The system may also include an electronic device 320 that includes a receiver 321 such as an antenna that is configured to receive the data transmitted from the transmitter of the illumination device 310. The configuration will be such that the receiver 321 can receive data transmitted by the transmitter's wireless communication protocol. The electronic device 320 will also include a processor 322 and may include a transmitter 323 that can transmit data generated by the processor 322 or relay data received by the receiver 321. The transmitter 323 and receiver 321 may be separate devices, or they may be components of a single device such as a transceiver. In an embodiment, the electronic device may also include a user interface to transmit to and/or receive instructions from a user of the electronic device. Examples may include, without limitation, a display, a touchscreen, an audio interface, or the like. Additional example components of such electronic devices will be discussed below in the discussion of FIG. 9.

The system also includes a computer-readable medium containing programming instructions that, when executed, cause the illumination device processor 312, the electronic device processor 322, both processors and/or other processing devices to: (i) analyze data received from the orientation sensor module and/or a processor to an orientation of the illumination device; (ii) analyze a photometric layout of a region to detect a desired aiming vector for the illumination device, (iii) compare the received orientation and the aiming vector to determine aiming error (if any); and (iii) if aiming error is present, provide a user with instruction to correct such error and/or provide instructions to a controller of the driving means to automatically correct the error. The computer-readable medium may be a memory 314 of the illumination device 310, a memory 324 of electronic device 320, or a memory 332 of another device such as a remote system 330 that is in wireless communication the electronic device 320.

The system may also optionally include a remote system 330 in electronic communication with the electronic device and/or the illumination device and may include features such as a receiver 331, processor 332, transmitter 333 and data storage facility 334. The data storage facility 334 may include photometric data and/or orientation data for one or more illumination devices in one or more areas.

Figure 4:
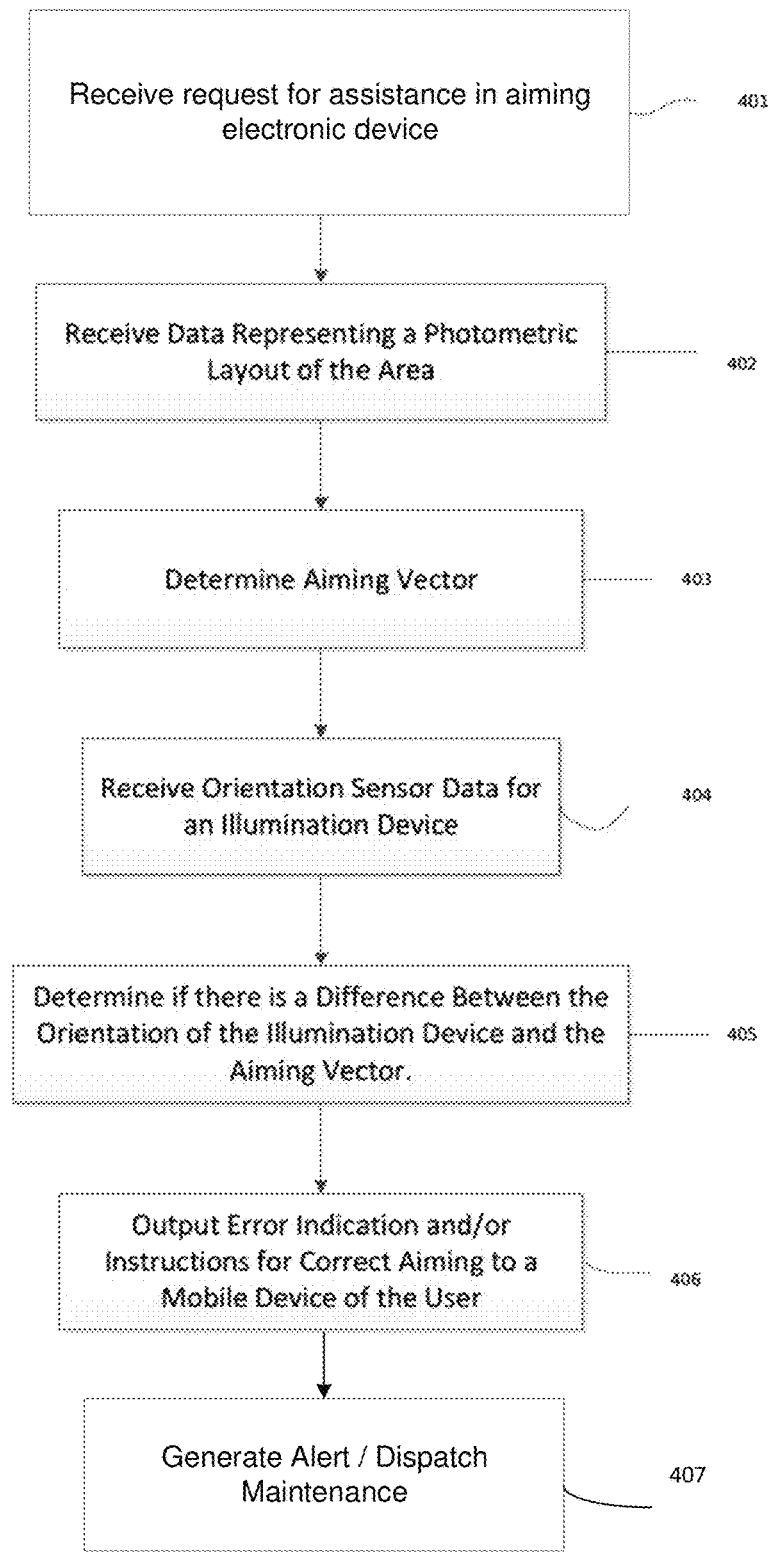
FIG. 4 illustrates a flowchart an example method for assisted aiming of light fixtures, according to an embodiment

FIG. 4 illustrates a flowchart corresponding to an example method for assisting in the aiming of illumination devices. In step 401, the system may receive a request for assistance in aiming of one or more illumination devices in an area. The request may come from a user electronic device in which the user entered the request via a user interface. Alternatively, the system may automatically monitor one or more orientation sensors of the illumination devices and generate a request for assistance in aiming when the data for one or more of the orientation sensors is outside of an expected range, which may indicate that the illumination device has been moved from its desired orientation. For example, one or more illumination devices may slowly move from the desired orientation over a period of time. Additionally and/or alternatively, one or more illumination devices may move from the desired orientation suddenly due to the occurrence of one or more events such as earthquakes (or other seismic activity), wind (or other weather related factors), tampering, collision of an object with the illumination device's support such as its pole (e.g., vehicle accidents that knock the pole over), etc. In an embodiment, the rate of change of orientation of one or more illumination devices may be indicative of the type of event that resulted in the change of orientation.

In another embodiment, the system may also include one or more external sensors (not shown here). In an embodiment, the external sensors may communicate (transmit and/or receive external sensor data or other information) with a short-range communication module of an illumination device via, for example a BLE protocol. Examples of external sensors may include, without limitation, light intensity sensors, color temperature sensors, $D_{uv}$ sensors, color temperature (CCT) sensors, color rendering index (CRI) sensors, and/or ambient air temperature sensors. In an embodiment, the system may monitor one or more external sensors of the illumination devices and generate a request for assistance in aiming when the data for one or more of the external sensors is outside of an expected range, which may be indicative of a change in orientation of the illumination device.

The system may receive 402 data representing a photometric layout of an area to be illuminated by one or more illumination devices. A photometric layout refers to a simulation design of a lighting setup for delivering the desired illumination at various points in an area using one or more illumination devices. It may provide a measure of the intensity, amount, color, flux, or other characteristics of light desired at one or more reference points in the given area.

In an embodiment, a user may provide the photometric layout to the system. Additionally and/or alternatively, the system may automatically determine the photometric layout based on one or more inputs or data (such as area layout, dimensions and locations of the illumination devices, etc.) provided by a user.

In step 403, the system may use the photometric layout to determine the aiming vector of the one or more illumination devices to provide the desired illumination at a plurality of points of the area. An aiming vector is a vector that represents the orientation of an illumination device with respect to a support structure or in the earth's reference frame such that when the illumination device is positioned in accordance with the aiming vector, it provides the desired illumination at one or more reference points of the area.

Figure 5:
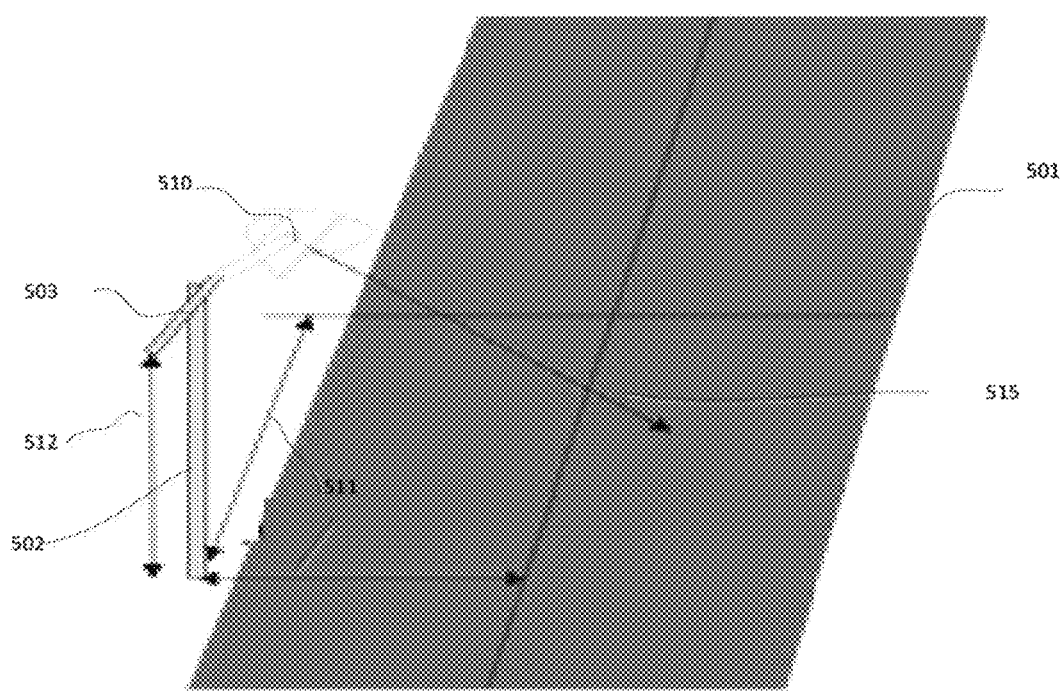
FIG. 5 illustrates an example area and an illumination device to be assisted in aiming according to a photometric layout, according to an embodiment.

FIG. 5 illustrates an example of a given area 501 including an illumination device 510 mounted on a mounting structure 502 via a mounting bracket 503, where a user requests assistance for aiming of the illumination device according to a photometric layout. Example areas may include entertainment facilities, sport arenas, fields, home theatres, indoor area, and/or the like. Other now or here after known mounting mechanisms are within the scope of this disclosure.

In an embodiment, if a location (511) and a height (512) of a mounting structure 502, and an orientation of a mounting bracket 503 with respect to the co-ordinates of the area to be illuminated are known, the system may use a photometric layout of the area to calculate the accurate aiming vector 515 for the illumination device mounted on the mounting structure 502. In an embodiment, the photometric layout of an area that provides a measure of the intensity, amount, color, flux, or other characteristics of light desired at one or more reference points may also be used to determine an orientation of a mounting bracket 503 with respect to the co-ordinates of the area to be illuminated. The aiming vector may be used to orient the illumination device such that it provides the desired illumination (per the photometric layout) at a given point in area 501. In an embodiment, the layout may include a plurality of illumination devices mounted on a plurality of mounting structures, and the system may determine aiming vectors for each of the plurality of lights for individually, in subgroups and/or collectively providing the desired intensity of light at any given point in area 501. Any now or hereafter known techniques such as, for example, geometrical calculus (taking into account the illumination characteristics of the illumination device) may be used to determine the orientation angle and/or the aiming vector.

In an example embodiment, the aiming vector may be defined using one or more angles of the illumination device 510 with respect to the mounting bracket 503. The one or more angles may be used to orient the illumination device relative to the mounting bracket 503 in order to achieve the illumination result as predicted by the photometric layout.

Figure 8A:
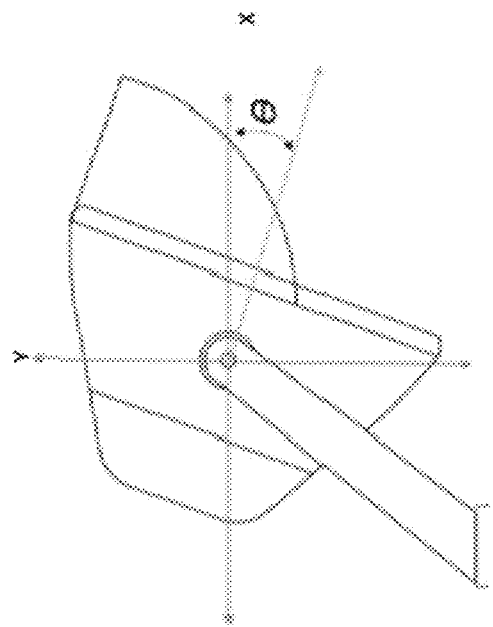
FIG. 8A and FIG. 8B illustrate an example of the aiming angles φ and θ of an illumination device in the earth's reference frame, according to an embodiment.
Figure 8B:
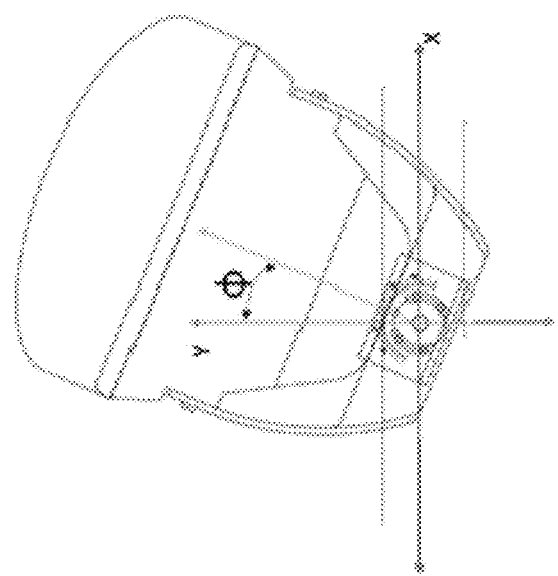

Optionally, in an embodiment, the system may transform the aiming vector such that it includes one or more angles of the illumination device 510 in the earth's reference frame (i.e., magnetic north). For example, in an embodiment, the angles between the illumination device 510 and the mounting bracket 503 may be converted to angles of the illumination device 510 in the earth's reference frame using known methods such as unit vectors, transformation matrices, or the like. FIG. 8A and FIG. 8B provide an example embodiment of the aiming angles $\varphi$ and $\theta$ of an illumination device in the earth's reference frame.

Returning now to FIG. 4, in step 404, the system may receive current orientation data of an illumination device for which aiming assistance is desired. In an embodiment, the orientation sensor module may be configured to determine the current orientation (such as orthogonal unit vectors, rotational matrix, etc.) of the illumination device with respect to a support structure and/or in the earth's reference frame. In an embodiment, the orientation sensor module of the illumination device may also be configured to sense one or more of linear acceleration, yaw, pitch and roll of the illumination device. Yaw generally references the orientation of the device to the Earth's magnetic poles or the rotational orientation of the element about a nadir axis. Yaw may be measured utilizing one or more sensors. For example, a digital compass such as a magnetometer, gyrocompass, and/or hall affect sensors may provide an electronic output indicative of orientation to the earth's magnetic poles. Pitch may also be detected which references the rotation of the particular element about a first axis perpendicular to the nadir axis and may be measured utilizing one or more sensors such as, for example, a gyroscope and/or an accelerometer. Roll references the rotation of the particular element about a third axis perpendicular to the nadir axis and the second axis and may be measured utilizing one or more sensors such as, for example, a gyroscope and/or an accelerometer.

The orientation sensing module and/or a processor of an illumination device may transmit the orientation data to an electronic device of a user requesting assistance in aiming of the illumination device. Alternatively and/or additionally, the orientation sensing module and/or a processor of an illumination device may continuously monitor the orientation data. A processing device of the system may then determine 405 if there is a difference between the current orientation of the illumination device and the aiming vector. Specifically, the system determines whether there is a threshold difference between a current orientation of the illumination device and a desired orientation of the illumination device, where the desired orientation corresponds to the aiming vector. If the system determines that a difference between the orientation of the illumination device and the aiming vector exists, the system may transmit a signal indicating the error to an electronic device and cause a user interface of an electronic device to output 406 an error indication and/or instructions for the correct aiming of the illumination device. For example, in an embodiment, the instructions may include the direction (and/or a magnitude) in which a user may move the illumination device for correct aiming of the illumination device.

In addition, if the system detects a position or orientation of a lighting device that is more than a threshold amount different from an expected position or orientation, the system may generate a maintenance alert 407, such as by transmitting a message to a maintenance worker or maintenance facility dispatcher. The message may include location data for the lighting device, along with an error indication and/or instructions for the correct aiming of the illumination device, so that a maintenance worker can be dispatched to the lighting device to correct the error. The location data may be received in the data transmitted from the device, or if the system receives a device identifier it may use that identifier to look up the lighting device's profile in a data set and extract location data from the device profile that is applicable to the device having that particular device identifier.

Alternatively, if the system determines that a difference between the orientation of the illumination device and the aiming vector exists, the system may transmit a control signal to a controller of the driving means of the illumination device connectors that in turn provides appropriate aiming commands to the driving means for accurate aiming of the illumination device. The driving means may include, for example, one or more motors that, when activated will turn an axle of the device (such as connector 41 of FIG. 1) or its mounting support (such as yoke 40 of FIG. 1). Alternatively, one or more LED modules of the lighting device may be connected to individual movable mounts, and the motor may be configured to cause one or more of the LED modules to individually move with respect to its mount.

The system may determine the instruction and/or the control signal by comparison of the yaw, pitch and/or roll of the illumination device with a stored set of aiming vectors, wherein each vector corresponds to a desired position of the illumination device. If the detected positional data is not within a threshold tolerance range of a desired aiming vector, then the system may generate an alert with instructions for re-positioning the illumination device.

Optionally, the system may transmit the aiming vector to the processor of the illumination device, which may perform the error determination and transmit the error message and/or the instructions to the electronic device.

In an embodiment, the system may continuously monitor the orientation and/or acceleration of the illumination device using the orientation sensor module, and may provide real-time feedback and instructions to a user and/or the controller of the driving means for an accurate aiming of the illumination device. For example, the system may compare received data for a set of known movement signatures, such as signatures that correspond to wind, earth tremors, or other known events that can cause movement of the device.

Figure 9:
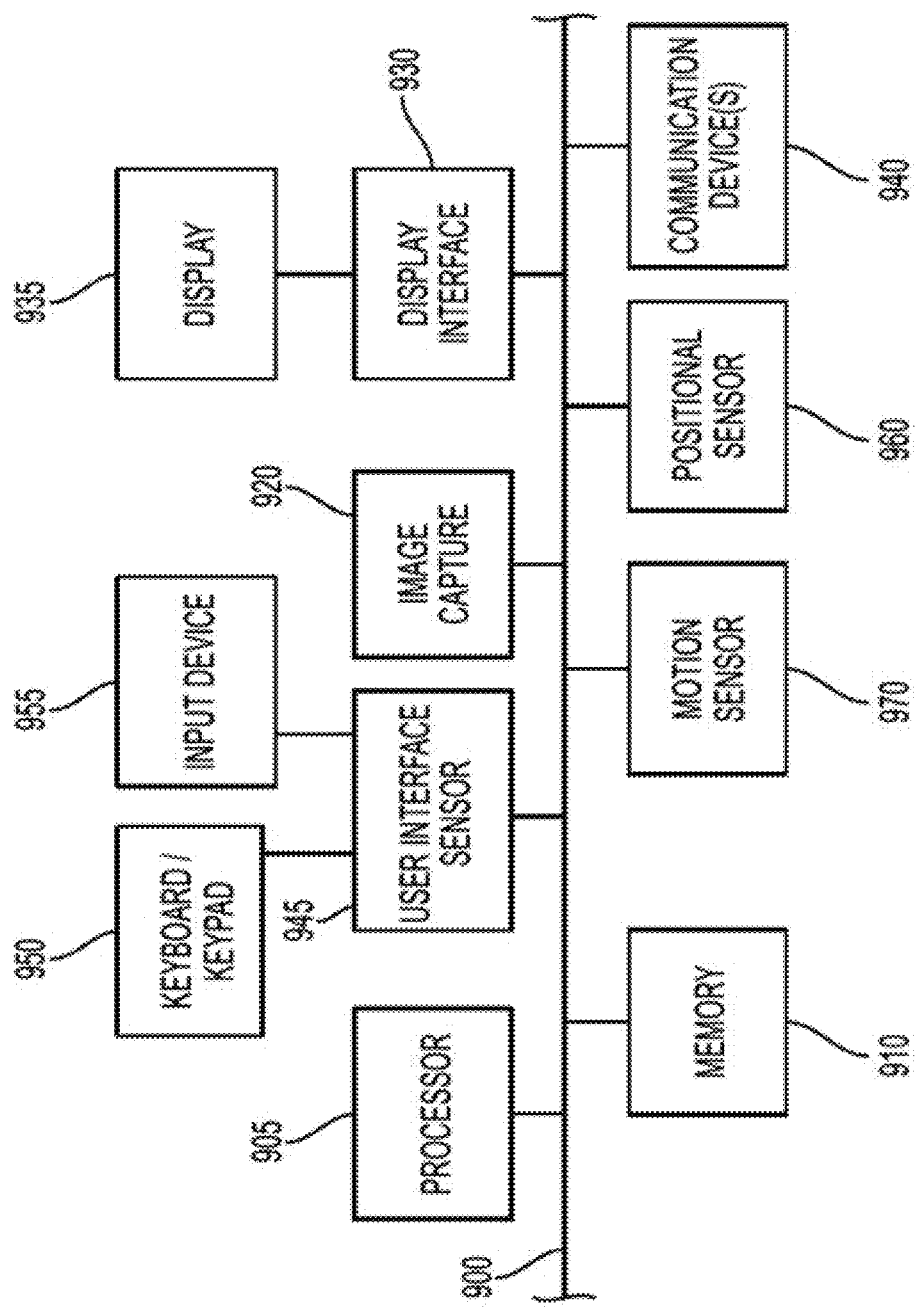
FIG. 9 illustrates an example of internal hardware that may be used to contain or implement the various computer processes and systems, according to an embodiment.

FIG. 9 depicts a block diagram of hardware that may be used to contain or implement program instructions, such as those of a cloud-based server, electronic device, virtual machine, or container. Some or all of the components of FIG. 9 may be included in a lighting device, while some or all components may be separate from the lighting device. A bus 900 serves as an information highway interconnecting the other illustrated components of the hardware. The bus may be a physical connection between elements of the system, or a wired or wireless communication system via which various elements of the system share data. Processor 905 is a processing device of the, performing calculations and logic operations required to execute a program. Processor 905, alone or in conjunction with one or more of the other elements disclosed in FIG. 9, is an example of a processing device, computing device or processor as such terms are used within this disclosure. The processing device may be a physical processing device, a virtual device contained within another processing device, or a container included within a processing device.

A memory device 910 is a hardware element or segment of a hardware element on which programming instructions, data, or both may be stored. Read only memory (ROM) and random access memory (RAM) constitute examples of memory devices, along with cloud storage services.

An optional display interface 930 may permit information to be displayed on the display 935 in audio, visual, graphic or alphanumeric format. Communication with external devices, such as a printing device, may occur using various communication devices 40, such as a communication port or antenna. A communication device 940 may be communicatively connected to a communication network, such as the Internet or an intranet.

The hardware may also include a user input interface 945 which allows for receipt of data from input devices such as a keyboard or keypad 950, or other input device 955 such as a mouse, a touch pad, a touch screen, a remote control, a pointing device, a video input device and/or a microphone. Data also may be received from an image capturing device 920 such as a digital camera or video camera.

In the lighting fixture, a sensor orientation module such as a positional sensor 960 and/or motion sensor 950 and associated programming may be included to detect position and movement of the illumination device. Examples of motion sensors 950 include gyroscopes or accelerometers. Examples of positional sensors 960 such as a global positioning system (GPS) sensor device that receives positional data from an external GPS network.

It is intended that the portions of this disclosure describing LED modules and control systems and methods are not limited to the embodiment of the illumination devices disclosed in this document. The LED modules, control systems and control methods may be applied to other LED illumination structures, such as those disclosed in U.S. Patent Application Pub. No. 2014/0334149 (filed by Nolan et al. and published Nov. 13, 2014), and in U.S. Patent Application Pub. No., 2015/0167937 (filed by Casper et al. and published Jun. 18, 2015), the disclosures of which are fully incorporated herein by reference.

The features and functions described above, as well as alternatives, may be combined into many other systems or applications. Various presently unforeseen or unanticipated alternatives, modifications, variations or improvements may be made by those skilled in the art, each of which is also intended to be encompassed by the disclosed embodiments.

The invention claimed is:

1. A method for providing assistance in aiming of one or more illumination devices in an area comprising, by a processor:
   receiving photometric data for an area that comprises an illumination device;
   using the photometric data to determine, for the illumination device, an aiming vector corresponding to the photometric data;
   receiving, from an orientation sensor module of the illumination device, current orientation data for the illumination device;
   analyzing the current orientation data and comparing the current orientation data to the aiming vector to determine if there is an error in the aiming of the illumination device; and
   in response to making the determination that there is an error in the aiming of the illumination device, wirelessly transmitting instructions by the processor to present an error message on a user interface of an electronic device, wherein the error message comprises a set of instructions to accurately aim the illumination device,
   wherein the photometric data comprises a desired measure of at least one light characteristic corresponding to light received from the illumination device at one or more reference points in the area when the illumination device is oriented in accordance with the aiming vector.

2. The method of claim 1, wherein the orientation data comprises one or more of the following: orientation vectors, a linear acceleration, a yaw, a pitch, or a roll of the illumination device.

3. The method of claim 1, further comprising providing control signals to a controller associated with a driving means of the illumination device for correcting the error in the aiming of the illumination device, wherein the driving means control movement of at least one component of the illumination device.

4. The method of claim 1, wherein the orientation sensor module comprises one or more of the following: an accelerometer, a gyroscope, an altimeter, or a magnetometer.

5. The method of claim 1, wherein using the current orientation data and the aiming vector to determine if there is an error in the aiming of the illumination device comprises determining whether there is a threshold difference between a current orientation of the illumination device and a desired orientation of the illumination device, wherein the desired orientation corresponds to the aiming vector.

6. The method of claim 1, further comprising determining a rate of change of orientation of the illumination device, wherein the rate of change of orientation is indicative of an event that resulted in the error in the aiming of the illumination device.

7. The method of claim 1, further comprising providing a control signal to a controller associated with a motor for correcting the error in the aiming of the illumination device, wherein the motor is configured to control orientation of the illumination device or a light emitting diode (LED) module included in the illumination device.

8. A lighting control system, comprising:
   an illumination device comprising one or more orientation sensors;
   a processor of the illumination device configured to transmit wireless communication signals to an electronic device; and
   a non-transitory computer-readable medium containing programming instructions that, when executed, will cause the processor of the illumination device to:
      receive photometric data for an area;
      use the photometric data to determine, for the illumination device, an aiming vector corresponding to the photometric data;
      receive, from the one or more orientation sensors of the illumination device, current orientation data for the illumination device;
      analyze the current orientation data and compare the current orientation data to the aiming vector to determine if there is an error in the aiming of the illumination device; and
      in response to making the determination that there is an error in the aiming of the illumination device, wirelessly transmit instructions to present an error message on a user interface of the electronic device, wherein the error message comprises a set of instructions to accurately aim the illumination device,
      wherein the photometric data comprises a desired measure of at least one light characteristic corresponding to light received from the illumination device at one or more reference points in the area when the illumination device is oriented in accordance with the aiming vector.

9. The system of claim 8, wherein the orientation data comprises one or more of the following: orientation vectors, a linear acceleration, a yaw, a pitch, or a roll of the illumination device.

10. The system of claim 8, wherein: the illumination device further comprises a controller associated with a driving means of the illumination device, wherein the driving means is configured to control movement of at least one component of the illumination device.

11. The system of claim 8, wherein the one or more orientation sensors comprise one or more of the following: an accelerometer, a gyroscope, an altimeter, a global positioning system (GPS) or a magnetometer.

12. The system of claim 8, wherein the programming instructions that, when executed, will cause the processor to use the current orientation data and the aiming vector to determine if there is an error in the aiming of the illumination device comprise programming instructions to determine whether there is a threshold difference between a current orientation of the illumination device and a desired orientation of the illumination device, wherein the desired orientation corresponds to the aiming vector.

13. The system of claim 8, further comprising programming instructions that, when executed, will cause the processor to determine a rate of change of orientation of the illumination device, wherein the rate of change of orientation is indicative of an event that resulted in the error in the aiming of the illumination device.

14. The system of claim 8, further comprising programming instructions that, when executed, will cause the processor to provide a control signal to a controller associated with a motor for correcting the error in the aiming of the illumination device, wherein the motor is configured to control orientation of the illumination device or a light emitting diode (LED) module included in the illumination device.

15. The method of claim 1, wherein the at least one light characteristic comprises at least one of the following: intensity of light, amount of light, color of light, or flux of light.

* * * * *